United States Patent [19]

Vlatkovic et al.

[11] Patent Number: 5,432,695
[45] Date of Patent: Jul. 11, 1995

[54] ZERO-VOLTAGE-SWITCHED, THREE-PHASE PWM RECTIFIER INVERTER CIRCUIT

[75] Inventors: Vlatko Vlatkovic; Dusan Borojevic; Fred C. Lee, all of Blacksburg, Va.

[73] Assignee: The Center for Innovative Technology, Herndon, Va.

[21] Appl. No.: 123,367

[22] Filed: Sep. 17, 1993

[51] Int. Cl.⁶ .......................................... H02M 7/521
[52] U.S. Cl. ......................... 363/138; 363/87; 363/98; 363/127; 363/132
[58] Field of Search ................. 363/40, 41, 44, 132, 363/136, 138, 84, 87, 89, 95, 96, 98, 127, 129

[56] References Cited

U.S. PATENT DOCUMENTS

| | | | |
|---|---|---|---|
| 4,502,106 | 2/1985 | Glennon | 363/132 X |
| 4,597,037 | 6/1986 | Okado | 363/41 |
| 5,138,544 | 8/1992 | Jessee | 363/132 X |
| 5,329,439 | 7/1994 | Borojevic et al. | 363/87 |
| 5,345,375 | 9/1994 | Mohan | 363/40 |

Primary Examiner—Brian K. Young
Assistant Examiner—Y. Jessica Han
Attorney, Agent, or Firm—Whitham, Curtis, Whitham & McGinn

[57] ABSTRACT

A novel switching rectifier circuit that combines the conventional three-phase, 6-stepped PWM rectifier/inverter circuit with a simple, low-power switch commutation circuit to provide zero-voltage turn-on for the switches, and soft turn-off for the diodes. The main features of the new circuit include elimination of switching losses on the power switches and reverse recovery problems on the diodes, elimination of the need for any snubbers in the three-phase bridge, possibility of use of slower diodes in the power bridge, constant frequency operation, and no increase in component current and voltage stresses over the conventional PWM rectifier.

2 Claims, 7 Drawing Sheets

ZERO-VOLTAGE-SWITCHED, THREE-PHASE PWM RECTIFIER INVERTER CIRCUIT

BACKGROUND OF THE INVENTION

1. Field of the Invention

The present invention generally relates to a novel switching rectifier circuit that combines the conventional three-phase, 6-stepped PWM boost rectifier/buck inverter, with a low-power switch commutation circuit. The commutation circuit provides zero-voltage turn-on for the switches, and soft turn-off for the diodes. It is only active during a short period of switching cycle, and it processes only a small fraction of the total power (below 5%), most of which is also transferred to the load.

2. Description of the Prior Art

In many applications it is desirable to have a controlled rectifier/inverter that can provide the following features: output voltage regulation, input power factor correction, low harmonic distortion of the currents drawn from the three-phase lines, minimal number of components and minimal components current and voltage stresses, high power density, and high efficiency. Conventionally, for higher power applications, a 3-phase, PWM boost rectifier/buck inverter has been used to meet the above requirements. However, this circuit suffers from severe switching losses and problems with the reverse recovery of the bridge diodes. In order to reduce the size of the reactive components, switching frequency must be increased, which is, however, accompanied with excessive increase of switching losses.

SUMMARY OF THE INVENTION

It is therefore an object of the present invention to reduce switching losses and eliminate the diode recovery problems in a three-phase PWM rectifier inverter circuit.

Briefly, this invention contemplates the provision of a novel switch commutating circuit for a conventional three-phase, 6-stepped PWM boost rectifier, buck inverter circuit of the type described more fully in "*Topologies and Analysis in PWM Inversion, Rectification and Cycloconversion*", by K. D. T. Ngo, Ph.D. Thesis, Pasadena Calif.; California Institute of Technology, 1984, incorporated herein by reference. The commutation circuit provides zero-voltage turn-on for the main switches, and zero current turn-off for the main diodes. It is active only during a short part of the switching cycle and therefore does not impair the PWM control of the converter. The commutation circuit processes only a small fraction of the total power (below 3%), most of which is transferred back to the load.

There are several features of this converter that distinguish it from other soft switching converters. One of the most important is that the proposed circuit provides soft switching without increasing voltage and current stresses on the main power devices. This is in contrast to resonant soft-switching techniques whose application can result in increased device voltage and/or current stresses, and ultimately in degraded efficiency and performance. The commutation circuit is implemented using only one controlled switch, which is controlled by a constant frequency, constants duty cycle signal.

BRIEF DESCRIPTION OF THE DRAWINGS

The foregoing and other objects, aspects and advantages will be better understood from the following detailed description of a preferred embodiment of the invention with reference to the drawings, in which:

FIG. 5 shows results of simulation for one high-frequency switching cycle of one circuit of FIG. 1A.

DETAILED DESCRIPTION OF A PREFERRED EMBODIMENT OF THE INVENTION

Figure 1A:
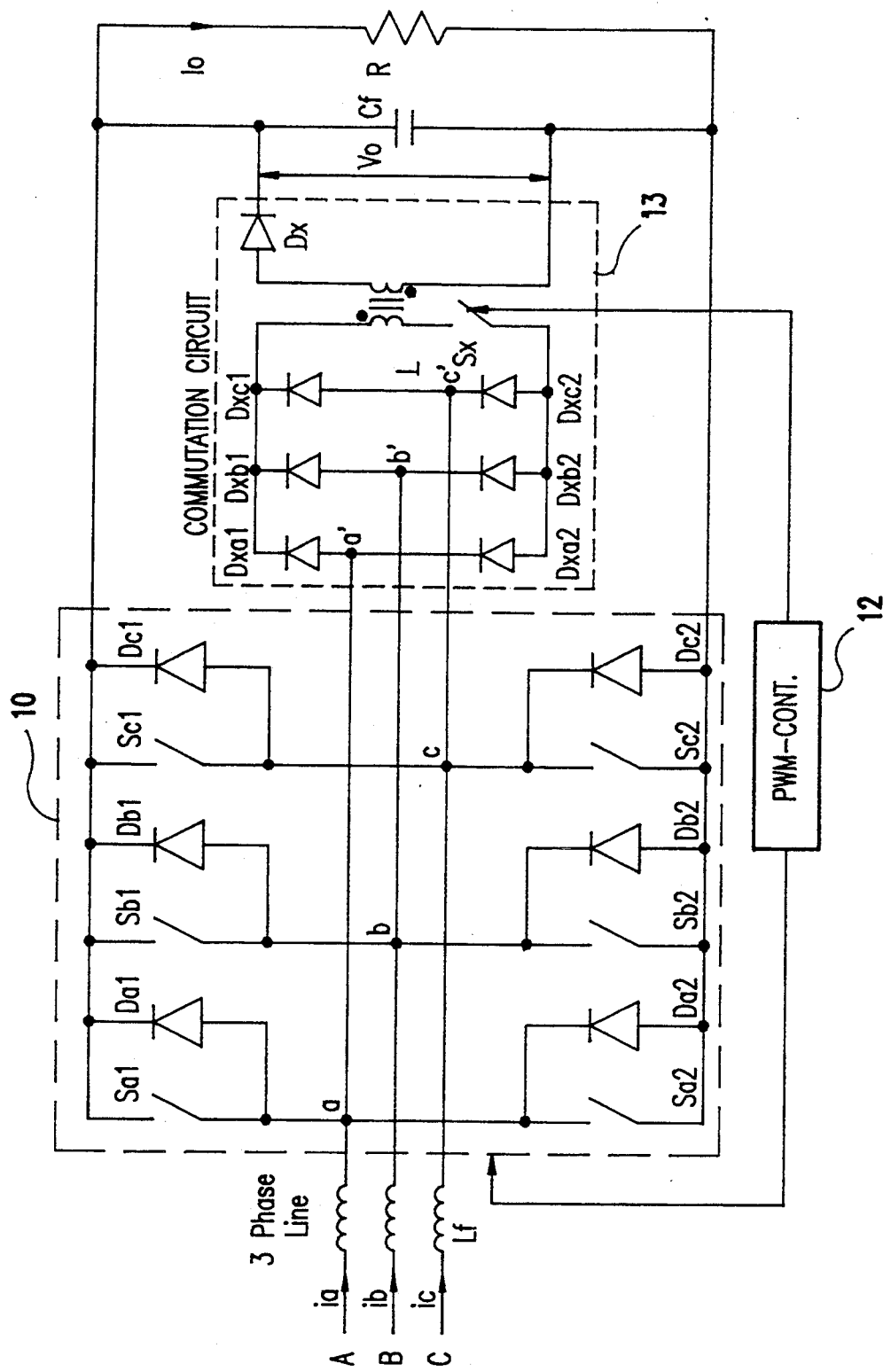
FIG. 1A is a novel switching rectifier circuit that combines the conventional three-phase, 6-stepped PWM boost rectifier/buck inverter, with a low-power switch commutation circuit in accordance with this invention.
Figure 2:
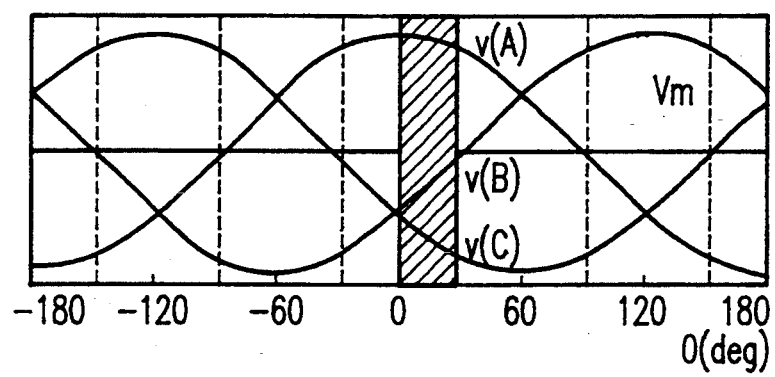
FIG. 2 is diagrams of the phase voltages.

Referring now to FIG. 1A, a novel switching rectifier circuit has a conventional three-phase, 6-stepped PWM boost rectifier/buck inverter described in the afore-referenced Ngo paper, comprised of a bridge switching circuit 10 whose switches Sa1, Sa2, Sb1, Sb2, Sc1, Sc2 are opened and closed by controller 12 and a capacitor Cf connected across the switching bridge 10 and the load R. The three-phase input lines A, B, and C are connected to the switching bridge 10 at nodes a, b, and c respectively. It will be appreciated that while the switches are represented schematically, they will be implemented by semiconductor switch devices. The phase voltages are shown in FIG. 2. As explained in Ngo, the six-step PWM control scheme is similar within any 30° interval between 0° and 30°. In this interval, the converter operates in rectifier mode if the input phase currents ia, ib and ic are positive, negative, and negative, respectively. The converter operates in inverter mode if the currents ia, ib, and ic are negative, and positive and positive, respectively. In accordance with the teachings of this invention, a commutation circuit 13 provides zero-voltage turn-on for the switches Sa1-Sa2; Sb1-Sb2; Sc1-Sc2, and soft turn-off for their diodes Da1-Da2, Db1-Db2, and Dc1-Dc2. The commutation circuit is only active during a short period of switching cycle, and it processes only a small fraction of the total power (below 5%), most of which is also transferred to the load.

The commutation circuit consists of a 6-pulse diode rectifier (Dxa1-Dxa2; Dxb1-Dxb2 and Dxc1-Dxc2) followed by a dc-to-dc flyback converter (transformer L and diode Dx) operating in discontinuous conduction mode. When the auxiliary switch Sx is closed, the magnetizing inductance of the transformer, L, is used to resonate with the parasitic capacitances of the nodes a, b or c providing zero-current and zero-voltage turn-off for the diodes and zero-voltage turn-on for the switches. After the desired commutation has been completed, the commutation circuit is deactivated by turning off Sx. The energy stored in the flyback transformer is delivered to the output of the converter. The soft commutation of the nodes a, b and c is retained under any line and load conditions.

Figure 1B:
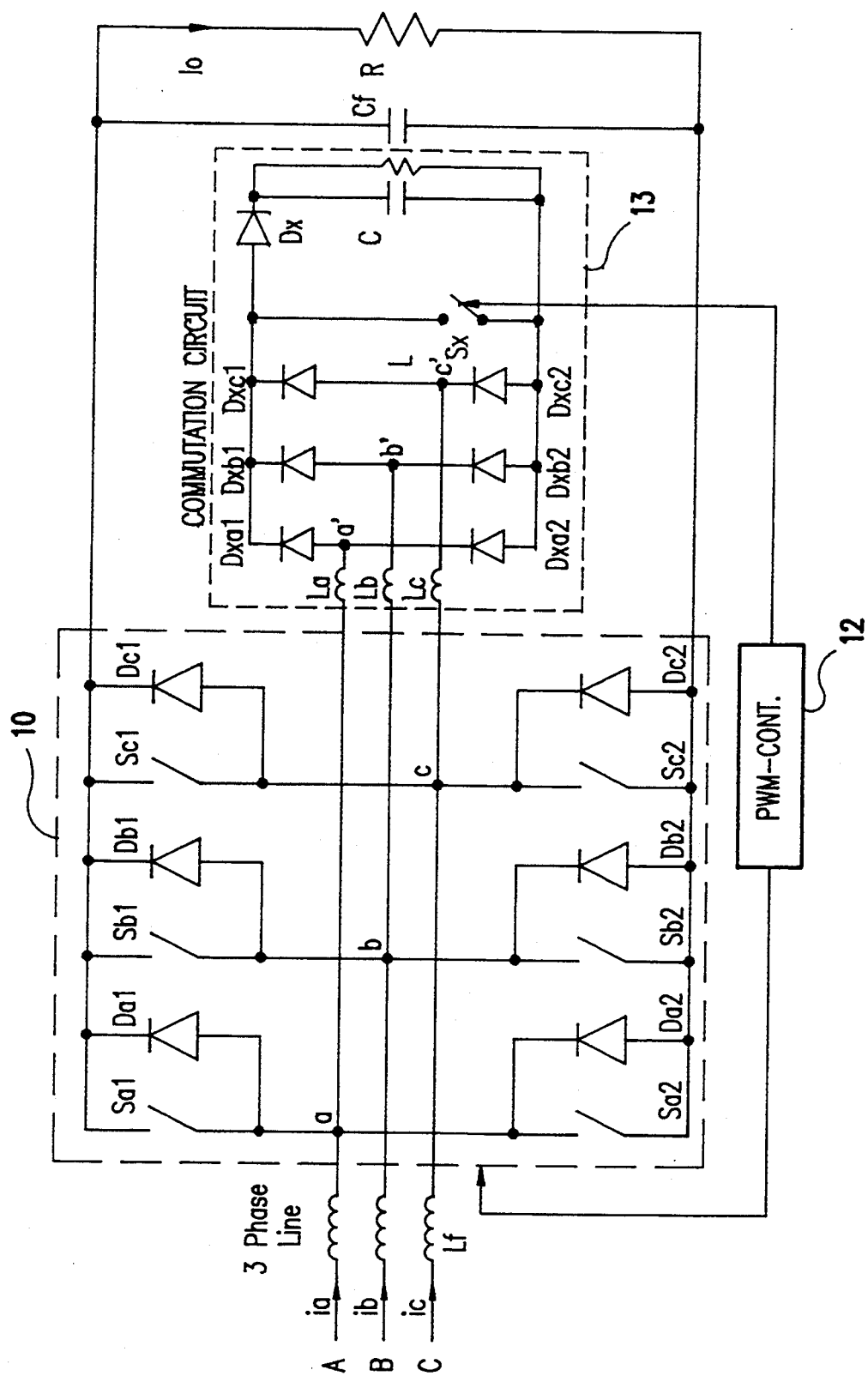
FIG. 1B is a circuit similar to FIG. 1A but with an alternate embodiment of the commutation circuit.

FIG. 1B shows an alternate embodiment of the commutation circuit. It should be noted that both in the embodiment of FIG. 1A and 1B, the commutation circuit is itself a small three-phase boost rectifier operating in discontinuous conduction mode. During most of the switching cycle, the auxiliary switch Sx is off, and the diode Dx is blocked, so that there is no current in the commutation circuit. When a main bridge diode needs to be turned off, the auxiliary switch Sx is closed. In the embodiment of FIG. 1B the current through inductances La, Lb, and Lc starts to increase from zero. In this process, the main bridge diode currents are gradually reduced to zero. The energy stored in the auxiliary inductors is then used to charge and discharge the parasitic power switch capacitances at the nodes a, b or c in a resonant fashion, swinging the voltage of these points between the two d.c. rails. This provides soft turn-off for the diodes and zero-voltage turn-on for the switches. After the desired node commutation has been completed, the commutation circuit is deactivated by turning off Sx. The small remaining energy stored in the auxiliary inductors is delivered then to the source Vx. The soft commutation of the nodes a, b, and c is maintained under any line and load conditions.

Figure 3:
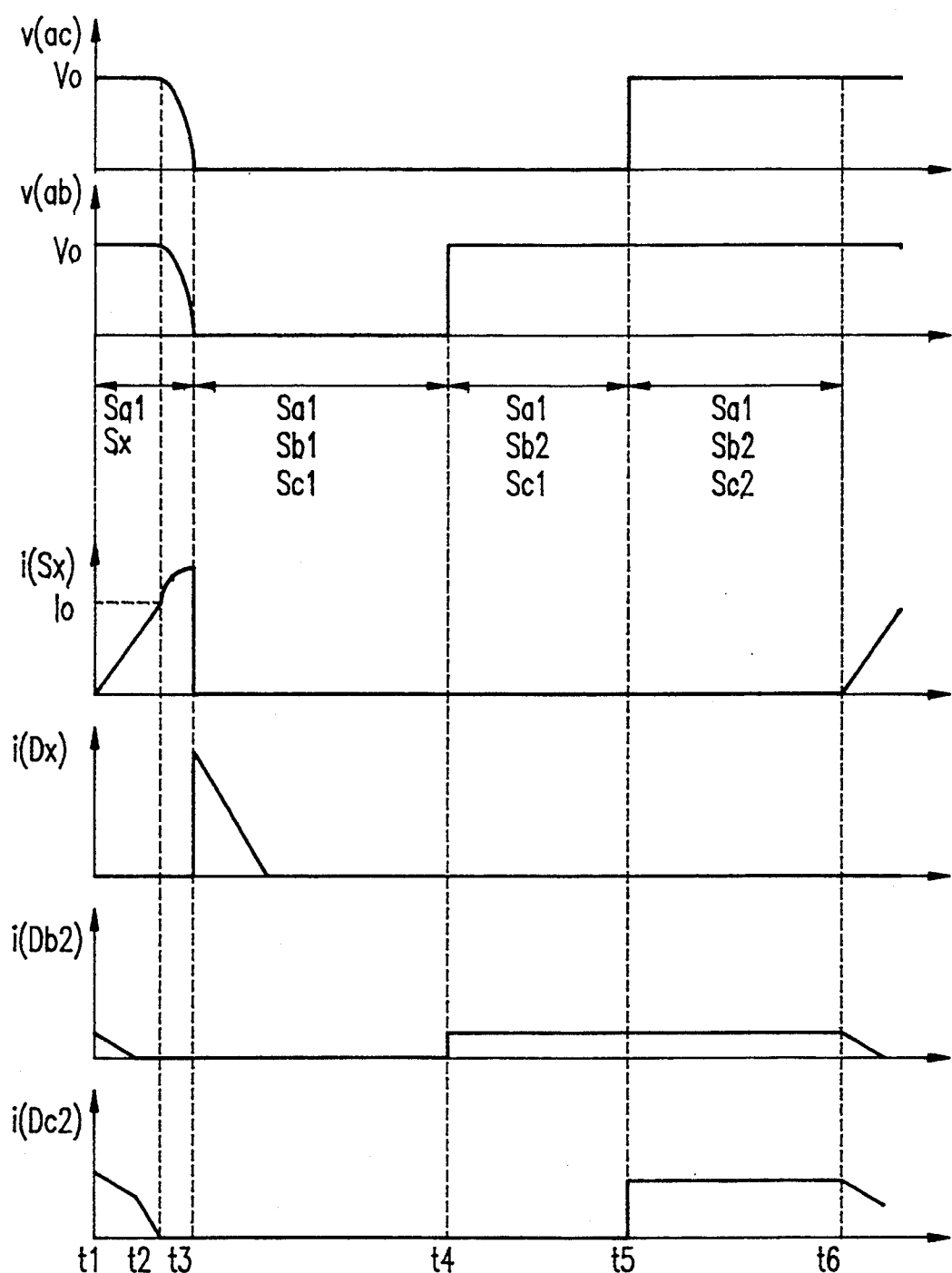
FIG. 3 shows the converter waveforms during a high-frequency switching period in rectifier mode of operation of the circuit of FIG. 1A.

FIG. 3 shows the converter waveforms during a high-frequency switching period for FIG. 1A in a rectifier mode of operation. In the following description, the superscripts '+' and '−' denote the time instances 'shortly after' and 'shortly before', respectively. The operation of the circuit in this period is described as follows: $t_1^-$ (same as $_6^-$):

Switches Sa1, Sb2 and Sc2 are on. The phase currents ia, ib, and ic, are flowing through the switch antiparallel diodes Da1, Db2, and Dc2, respectively. The auxiliary switch Sx is off and there is no current in the auxiliary circuit. The voltage between points a and b, and da and c is equal to the output voltage, Vo. $t_1$ to $t_2^-$:

At $t_1$ Sx turns on, Sb2, and Sc2 turn off. The output voltage is applied across the magnetizing inductance, L, of the auxiliary transformer, causing current to start flowing from the output capacitor through Da1, Dxa1, L, Sx, Dxb2 and Dxc2, Db2 and Dc2 and back to the output capacitor. This current is linearly increasing, and, therefore, the currents of Da1, Db2 and Dc2 are linearly decreasing. At time $t_2^-$, the current of Sx reaches ia, and the currents of diodes Da1, Db2, and Dc2 reach 0. The rate of the bridge diode current decrease can be adjusted by choosing an appropriate value of L, so that the reverse recovery currents of Db2 and Dc2 can be eliminated. $t_2$ to $t_3^-$:

The inductance of the auxiliary transformer starts resonating with the parasitic capacitances of nodes b and c. The voltages vab and vac are decreasing in a resonant fashion, while the current of Sx is increasing. The current of Sx in excess of ia is flowing through Sa1. At $t_3^-$ the voltages vab and vac reach 0. The current of Sx flows through Sa1, Db1 and Dc1. $t_3$ to $t_4^-$:

At $t_3$, the switches Sb1 and Sc1 turn-on under zero-voltage conditions. Sx turns off. The current of the auxiliary transformer flows in the secondary through Dx. The current of Dx linearly decreases until it reaches 0. $t_4$ to $t_5^-$:

At $t_4$ Sb1 turns off. The current of the input filter inductor, ib, charges the parasitic capacitance of node b, and makes the diode Db2 conduct. The switch Sb2 is turned on under zero-voltage condition. $t_5$ to $t_6^-$:

At $t_5$ Sc1 turns off. The current of the input filter inductor, ic, charges the parasitic capacitance of node a, and makes the diode Dc2 conduct. The switch Sc2 is turned on under zero-voltage conditions.

Figure 4:
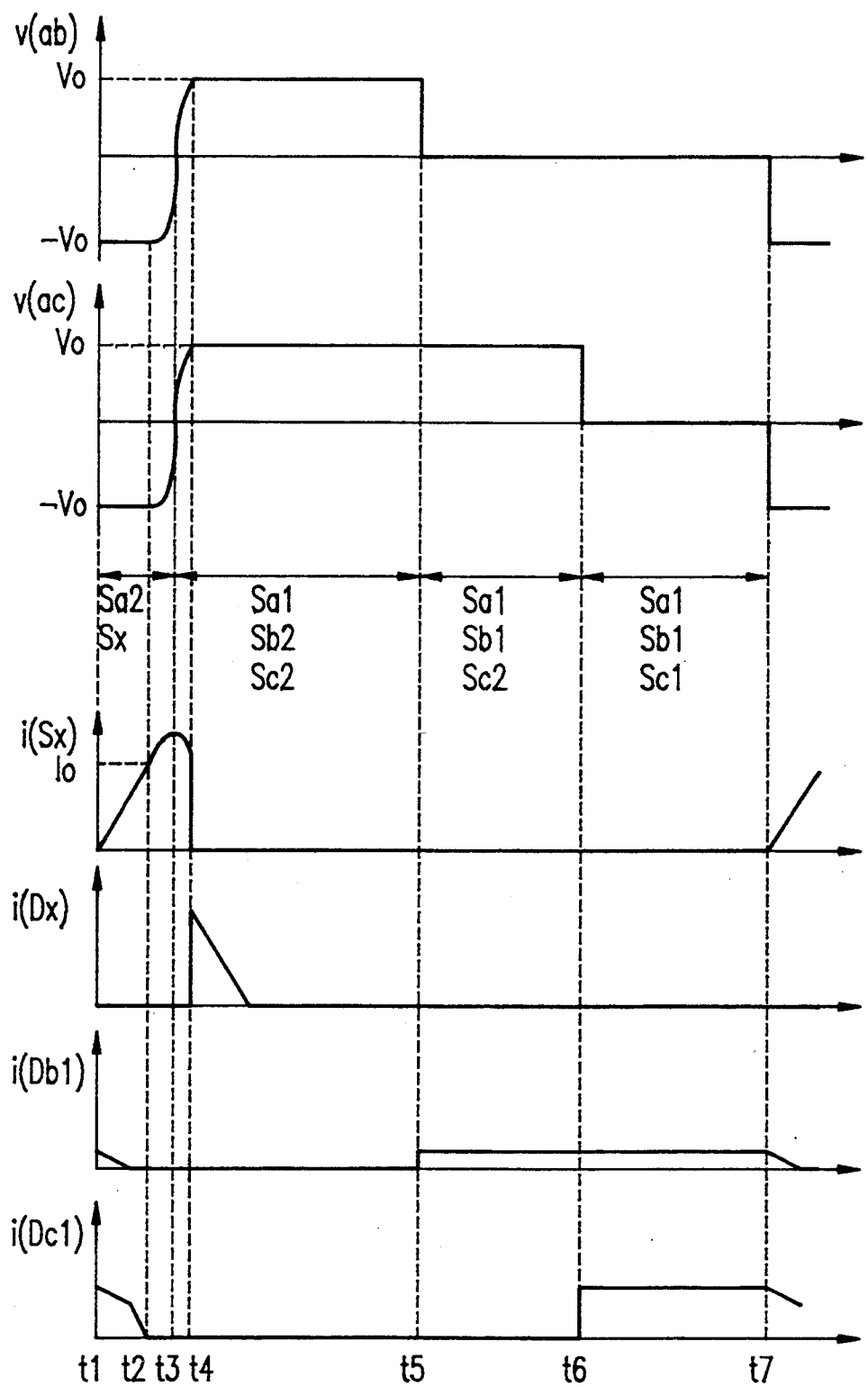
FIG. 4 shows the converter waveforms during a high-frequency switching period of the circuit of FIG. 1A.

FIG. 4 shows the converter waveforms during a high-frequency switching period, within the interval when the input phase voltage is between 0° and 30°, in inverter mode of operation. The operation of the circuit in this mode is described as follows: $t_1^-$ (same as $t_7^-$):

Switches Sa1, Sb1 and Sc1 are on. The phase currents ia, ib and ic, are flowing through the switch Sa1, and the antiparallel diodes Db1 and Dc1, respectively. The auxiliary switch Sx is off and there is no current in the auxiliary circuit. The voltage between points a and b, and a and c, is equal to 0. $t_1$ to $t_2^-$:

At $t_1$ Sa1 turns off. The current of the input filter inductor, ia, charges the parasitic capacitance of node a and makes the diode Da2 conduct. The switch Sa2 is turned on under zero-voltage condition. This makes the voltages vab and vac equal to the negative output voltage. At the same time Sx turns on, Sb1 and Sc1 turn off. The output voltage is applied across the magnetizing inductance, L, of the auxiliary transformer, causing current to start flowing from the output capacitor, through Db1 and Dc1, Dxb1 and Dxc1, L, Sx, Dxa2, Da2 and back to the output capacitor. This current is linearly increasing, and, therefore, the currents of Da2, Db1 and Dc1 are linearly decreasing. At the time $t_2^-$, the current of Sx reaches ia, and the currents of diodes Da2, Db1 and Dc1 reach 0. The rate of the bridge diode current decrease can be adjusted by choosing an appropriate value of L, so that the reverse recovery currents of Db1 and Dc1 can be eliminated. $t_2$ to $t_3^-$:

The inductance of the auxiliary transformer starts resonating with the parasitic capacitances of nodes b and c. The voltages vab and vac and the current of Sx are increasing in a resonant fashion. The current of Sx in excess of ia is flowing through Sa2. At $t_3$ sup—the voltages vab and vac reach 0. The current of Sx flows through Sa2, Db2 and Dc2. $t_3$ to $t_4^-$:

At $t_3$, the switches Sb2 and Sc2 turn-on under zero-voltage conditions. At the same time, Sa2 turns off. The inductance of the auxiliary transformer starts resonating with the parasitic capacitance of node a, further increasing the voltages vab and vac until they reach the output voltage at $t_4^-$. At that instant the current of Sx starts flowing through Da1. $t_4$ to $t_5^-$:

At $t_4$, Sa1 is turned on under zero-voltage condition. At the same time Sx turns off. The current of the auxiliary transformer flows in the secondary through Dx. The current of Dx linearly decreases until it reaches 0. $t_5$ to $t_6^-$:

At $t_5$, Sb2 turns off. The current of the input filter inductor, ib, charges the parasitic capacitance of node b, and makes the diode Db1 conduct. The switch Sb1 is turned on under zero-voltage condition. $t_6$ to $t_7^-$:

At $t_6$, Sc2 turns off. The current of the input filter inductor, ic, charges the parasitic capacitance of node c, and makes the diode Dc1 conduct. The switch Sc1 is turned on under zero-voltage condition.

Figure 5A:
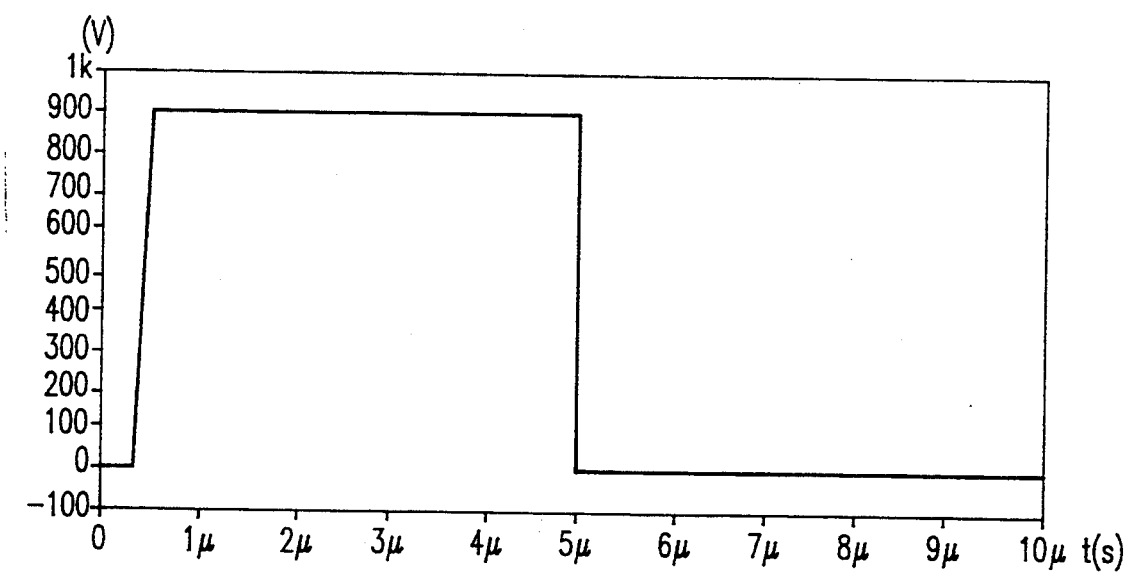
FIG. 5a shows the voltage of the node c which is identical as in the conventional three-phase, 6 stepped PWM boost rectifier for the embodiment of FIG. 1A.
Figure 5B:
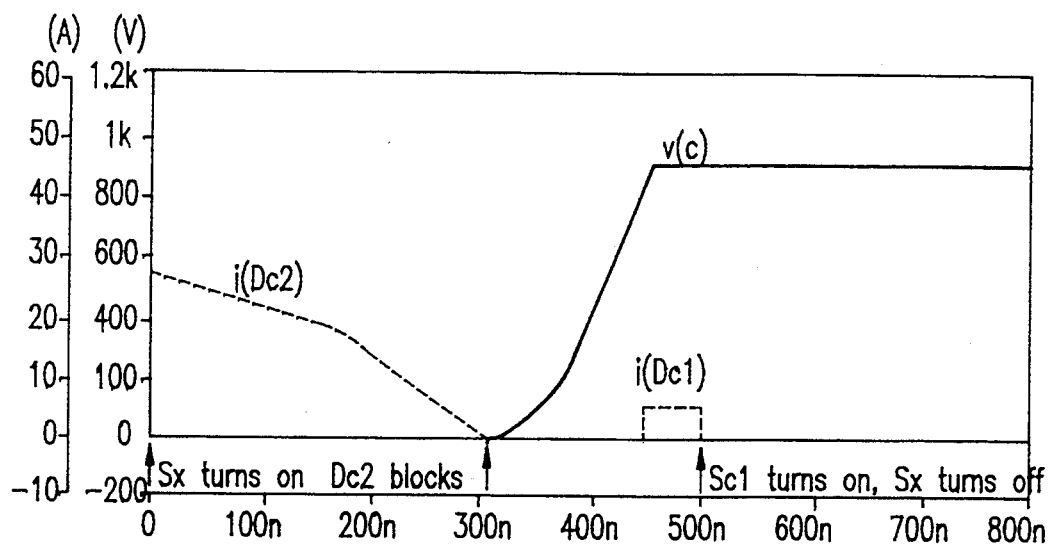
FIG. 5b shows a detail of the voltage of the node c, current of the diode Dc2, and current of the diode Dc1 for the embodiment of FIG. 1A.
Figure 5C:
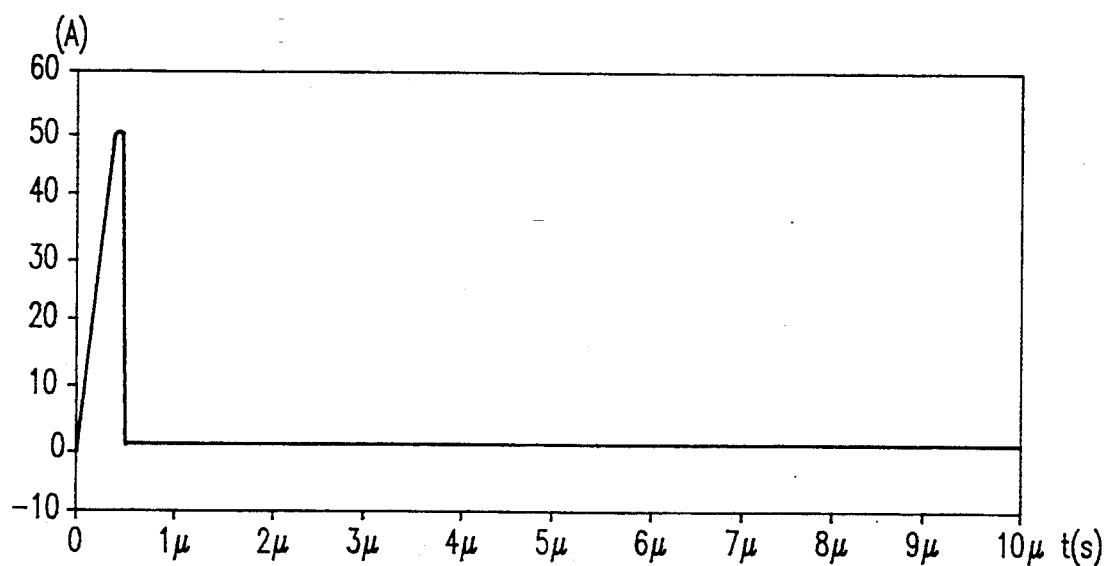
FIG. 5c shows the current of the auxiliary switch Sx for the embodiment of FIG. 1A.

FIG. 5 shows results of simulation for one high-frequency switching cycle in which the current of diode Dc2 is commutated to the switch Dc1. The converter is operating in rectifier mode. FIG. 5a shows the voltage of the node c which is identical as in the conventional three-phase, 6-stepped PWM boost rectifier. The current commutation from the diode Jc2 to the switch Sc1, taking place around t=0, is assisted by the commutation circuit. FIG. 5b shows a detail of the voltage of the node c, current of the diode Dc2, and current of the diode Dc1. The current of Dc2 is gradually reduced to zero before the voltage is increased in resonant fashion. This illustrates the soft turn-off condition for the diode Dc2. When the voltage of the node c reaches the output voltage (900 V), the diode Dc1 starts conducting, providing zero-voltage turn-on condition for the switch Sc1, which is turned on at t=500 ns. FIG. 5c shows the current of the auxiliary switch Sx illustrating that the commutation circuit is active only during short time around t=0, and thus does not significantly affect the operation of the power circuit. The current connotation from the switch Sc1 to the diode Dc2 takes place naturally, without the assistance of the commutation circuit, after turning off Sc1 at t=5 us. The commutation process is similar for the nodes a and b under any other line and load conditions.

The main features of the new circuit include elimination of switching losses on the power switches and reverse recovery problems on the diodes, elimination of the need for any snubbers in the three-phase bridge, possibility of use of slower diodes in the power bridge, constant frequency operation, and no increase in component current and voltage stresses over the conventional PWM counterpart. All these characteristics, together with the high switching frequency capability, provide for significantly higher efficiency and power density than in the conventional three-phase PWM rectifier/inverter. The following table shows a comparative loss breakdown, calculated analytically, for a 16 kW PWM, and zero-voltage switched PWM (ZVS-PWM) boost converters operating at 100 kHz.

| LOSSES (% OF TOTAL POWER) | PWM | ZVS-PWM |
| --- | --- | --- |
| Switch Conduction Losses | 1 | 0.5 |
| Switch Switching Losses | 1 | 0 |
| Diode Conduction Losses | 1.5 | 1.5 |
| Diode Switching Losses | 1 | 0 |
| Commutation Circuit Losses | 0 | 0.5 |
| Losses in Magnetics | 0.5 | 0.5 |

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A three-phase, 6-stepped pulse-width-modulated, boost rectifier/buck inverter circuit including a bridge comprised of three pairs of semiconductor switches with parallel connected diodes connecting respectively a node to which each phase of a three-phase input is connected to a pair of d.c. output rails, one of said semiconductor switches remaining open and one remaining closed during thirty-degree segments of the three-phase input while the remaining semiconductor switches are turned on and off by a pulse-width-modulating signal, the improvement comprising:

a commutation circuit including an inductance coupled to each of said nodes by means of an auxiliary switch means so that, when said auxiliary switch means is closed, current flow in said parallel diodes is gradually reduced and a resonant circuit comprised of said inductance and a parasitic capacitance of said semiconductor switches at said nodes generates a zero voltage across said switches at a turn-on of said semiconductor switches by said pulse-width-modulating signal; and means to turn-on said auxiliary switch means for a short interval prior to turn-on of said semiconductor switch by said pulse-width-modulating signal.

2. A three-phase, 6-stepped pulse-width-modulated, boost rectifier/buck inverter circuit as in claim 1, wherein said commutation circuit comprises a three-phase boost rectifier operating in a discontinuous conduction mode.

* * * * *